United States Patent
Kim et al.

(10) Patent No.: US 8,020,189 B2
(45) Date of Patent: Sep. 13, 2011

(54) FAST ADAPTIVE CHANNEL CONVERTING METHOD AND APPARATUS, AND COMPUTER READABLE RECORDING MEDIUM FOR EXECUTING THE FAST ADAPTIVE CHANNEL CONVERTING METHOD

(75) Inventors: Chang-yong Kim, Yongin-si (KR); Yoo-seung Hwang, Seoul (KR); Jae-kwan Ryoo, Suwon-si (KR); Ki-Jung Yoo, Gumpo-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 323 days.

(21) Appl. No.: 12/271,244

(22) Filed: Nov. 14, 2008

(65) Prior Publication Data

US 2009/0217339 A1    Aug. 27, 2009

(30) Foreign Application Priority Data

Feb. 21, 2008   (KR) .................. 10-2008-0015911

(51) Int. Cl.
  G06F 3/00    (2006.01)
  H04N 7/173   (2011.01)
  H04N 7/16    (2011.01)
(52) U.S. Cl. ........................... 725/131; 725/56; 725/134

(58) Field of Classification Search .................... 725/56, 725/86, 95, 100, 131, 134
See application file for complete search history.

(56) References Cited

U.S. PATENT DOCUMENTS

2008/0092203 A1 *   4/2008   Bouazizi et al. ............... 725/135
2008/0141317 A1 *   6/2008   Radloff et al. .................. 725/87

* cited by examiner

Primary Examiner — Kieu Oanh Bui
(74) Attorney, Agent, or Firm — Jefferson IP Law, LLP (57) ABSTRACT

A fast adaptive channel converting method and apparatus, and a computer readable recording medium having recorded thereon a program to execute the fast adaptive channel converting method. The fast adaptive channel converting method includes generating adjacent channel data by pre-signal processing an adjacent channel signal of a reference channel, receiving a channel change request from a user, searching for channel data corresponding to a changed channel in the adjacent channel data, and reproducing the searched channel data. Unlike a conventional technology, the fast adaptive channel changing apparatus and method prevents a screen blank time that may occur while changing a channel in a digital broadcast receiving apparatus, and thus boredom or inconvenience of a user can be removed. Also, when a channel is changed by using a preferred channel list, a channel search time can be remarkably reduced, and the user can easily watch a program of a preferred channel.

30 Claims, 7 Drawing Sheets

| CHANNEL NUMBER | CHANNEL NAME | CENTER FREQUENCY | QAM MODE | PROGRAM NUMBER |
|---|---|---|---|---|
| . | . | . | . | . |
| 6 | SBS | | | |
| 7 | KBS1 | | | |
| 9 | KBS2 | | | |
| 11 | MBC | | | |
| 13 | EBS | | | |
| . | . | . | . | . |
| . | . | . | . | . |

| CHANNEL NUMBER | CHANNEL NAME | CENTER FREQUENCY | QAM MODE | PROGRAM NUMBER |
|---|---|---|---|---|
| 7 | KBS1 | | | |
| 22 | OCN | | | |
| 1 | MBC | | | |
| 17 | YTN | | | |
| 53 | GOLF | | | |

FAST ADAPTIVE CHANNEL CONVERTING METHOD AND APPARATUS, AND COMPUTER READABLE RECORDING MEDIUM FOR EXECUTING THE FAST ADAPTIVE CHANNEL CONVERTING METHOD

CROSS-REFERENCE TO RELATED PATENT APPLICATION

This application claims the benefit of Korean Patent Application No. 2008-15911, filed in the Korean Intellectual Property Office on Feb. 21, 2008, the disclosure of which is incorporated herein in its entirety by reference.

BACKGROUND OF THE INVENTION

1. Field of the Invention

Aspects of the present invention relate to changing a broadcast channel, and more particularly, to a fast adaptive channel changing method and apparatus of a digital broadcast channel.

2. Description of the Related Art

Generally, when a user changes from a currently watched broadcast channel to another channel while using a digital broadcast reproducing apparatus, such as a digital television (DTV) or a cable set-top box, the digital broadcast reproducing apparatus detects channel mapping information, such as corresponding channel frequency information, by interpreting a channel change request from the user. The digital broadcast reproducing apparatus tunes a broadcast signal using a tuner by referring to the detected channel mapping information, and reproduces the tuned broadcast signal via demodulation and decoding. Several signal processing operations are performed before the user finally watches a program of the newly changed channel. Accordingly, a halt time (hereinafter, referred to as a screen blank time) may occur in the digital broadcast reproducing apparatus for a predetermined time after changing the channel. However, since at least 1.8 seconds to 5 seconds are consumed as the screen blank time, the user may be bored while waiting, or may purchase an analog TV instead of a DTV.

SUMMARY OF THE INVENTION

Aspects of the present invention provide a fast adaptive channel changing apparatus and method, which can prevent a screen blank time by using an unused resource of a digital broadcast reproducing apparatus, and a computer readable recording medium having recorded thereon a program for executing the fast adaptive channel converting method.

According to an aspect of the present invention, a fast adaptive channel changing apparatus is provided. The apparatus includes a signal processing unit to signal process at least two channel signals; a channel list managing unit to generate a channel list including channel information related to the at least two channel signals; and a main control unit to control the signal processing unit to pre-signal process an adjacent channel of a reference channel based on the channel list.

According to another aspect of the present invention, a digital broadcast reproducing apparatus is provided, which includes the fast adaptive channel changing apparatus.

According to another aspect of the present invention, a fast adaptive channel changing method is provided. The method includes generating adjacent channel data by pre-signal processing an adjacent channel signal of a reference channel; receiving a channel change request from a user; searching for channel data corresponding to a changed channel in the adjacent channel data; and reproducing the searched changed channel data.

According to another aspect of the present invention, a computer readable recording medium is provided, having recorded thereon a program to execute a fast adaptive channel changing method, the method including generating adjacent channel data by pre-signal processing an adjacent channel signal of a reference channel; receiving a channel change request from a user; searching for channel data corresponding to the changed channel in the adjacent channel data; and reproducing the searched changed channel data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENT

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
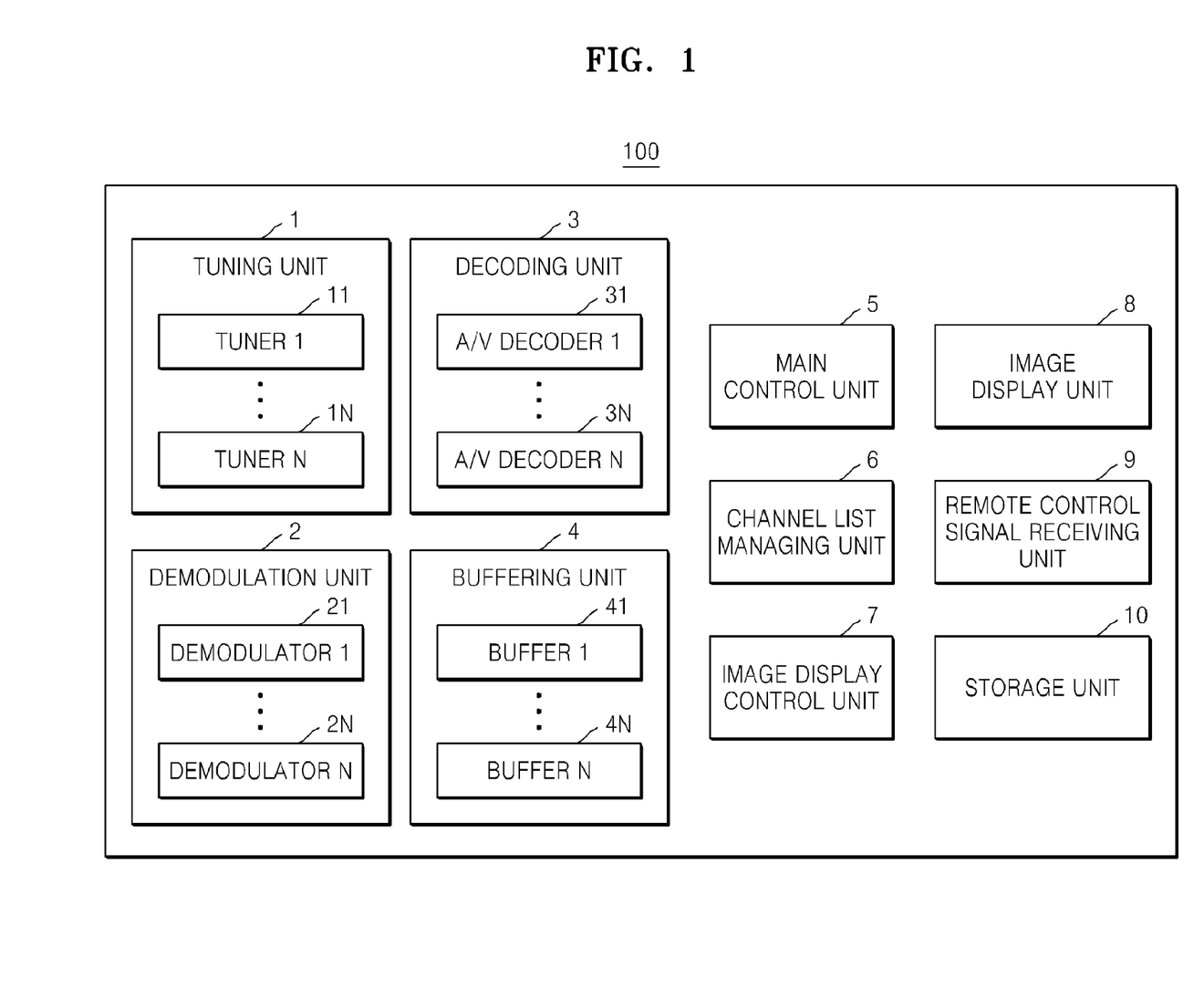
FIG. 1 is a block diagram illustrating a physical structure of a fast adaptive channel changing apparatus according to an embodiment of the present invention.

FIG. 1 shows a fast adaptive channel changing apparatus 100 according to an embodiment of the present invention. The fast adaptive channel changing apparatus 100 may be part of a digital television (DTV), a set-top box, or other digital broadcasting reproducing apparatus, or as an independent apparatus.

The fast adaptive channel changing apparatus 100 includes a tuning unit 1, a demodulation unit 2, a decoding unit 3, a buffering unit 4, a main control unit 5, a channel list managing unit 6, an image display control unit 8, an image display unit 8, a remote control signal receiving unit 9, and a storage unit 10. According to other aspects of the present invention, the fast adaptive channel changing apparatus 100 may include additional and/or different units. Similarly, the functionality of two or more of the above units may be integrated into a single component. The tuning unit 1, the demodulation unit 2, the decoding unit 3, and the buffering unit 4 respectively include N tuners 11 through 1N, N demodulators 21 through 2N, N A/V decoders 31 through 3N, and N buffers 41 through 4N. Generally, the number of the tuners 11 through 1N is 2 through 4, but may be 5 or more in other aspects of the present invention.

The tuning unit 1 tunes a signal of a certain channel by filtering a digital broadcasting signal received by the DTV or the like. The demodulation unit 2 modulates a channel signal tuned by the tuning unit 1. The decoding unit 3 decodes a channel signal demodulated by the demodulation unit 2. The buffering unit 4 temporarily stores the demodulated channel signal or the decoded channel data. Hereinafter, it will be understood that a signal processing unit refers to the tuning unit 1, the demodulation unit 2, the decoding unit 3, and the buffering unit 4.

The channel list managing unit 6 generates a channel list including channel information about all channel signals received by the DTV or the like. The channel list managing unit 6 may also generate a preferred channel list including channel information about channels having high audience frequencies.

The main control unit 5 refers to the channel list or the preferred channel list, and controls the signal processing unit to pre-signal process adjacent channels of a channel that is currently being reproduced by the DTV (hereinafter, referred to as a reference channel). Here, the main control unit 5 may generate a mapping table. The mapping table maps correspondence between pre-signal processed channel data and corresponding channel information.

When a channel change request is received from a user, the main control unit 5 detects channel data corresponding to a changed channel from the buffering unit 4 by referring to the mapping table, and immediately displays or reproduces the channel data on the image display unit 8. The storage unit 10 stores the demodulated channel signal, the channel data, the channel list, and the preferred channel list. The storage unit 10 stores data of a program that was being reproduced when the DTV is turned off. The channel list should be reproduced first so as to use the fast adaptive channel changing apparatus and method according to aspects of the present invention.

Figure 5A:
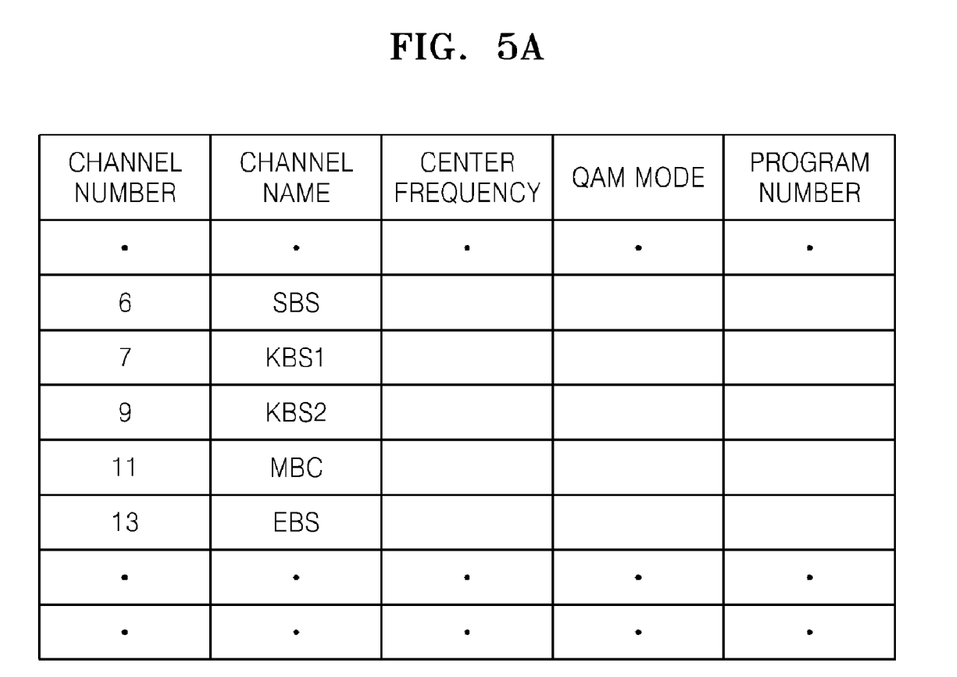
FIG. 5A is a diagram illustrating an example of a channel list according to an embodiment of the present invention.

The channel list managing unit 6 generates a channel list including channel information about all channels received through the DTV. FIG. 5A shows an example of the channel list according to an embodiment of the present invention. Referring to FIG. 5A, the channel list includes information used for tuning, demodulating, and decoding a channel signal, such as a channel number, a channel name, a center frequency, a QAM mode (64 or 256), and a program number. According to another embodiment of the present invention, the channel list may be provided to a user (or the DTV) after being generated by a broadcast program provider, such as a content provider, a wired broadcasting station, or an airwave broadcasting station.

It will be understood that "signal processing" refers to tuning, demodulating, and decoding a channel signal after receiving the channel signal. In some cases, "signal processing" may refer to tuning, demodulating, decoding, and storing a channel signal. "Channel data" is a term used to distinguish from a channel signal. "Channel data" refers to a signal processed channel signal generated by signal processing a channel signal.

Figure 2:
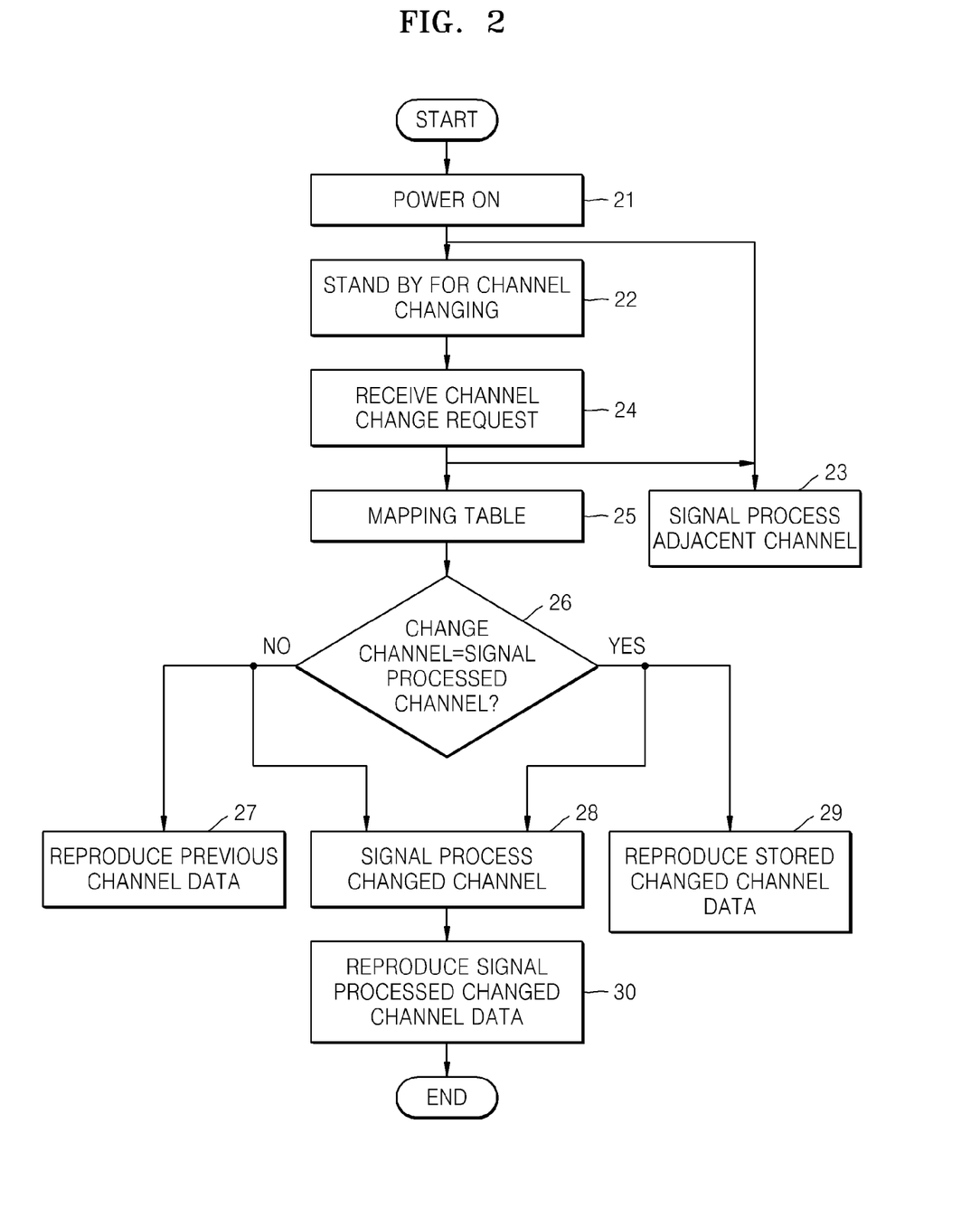
FIG. 2 is a flowchart illustrating a fast adaptive channel changing process according to an embodiment of the present invention.

FIG. 2 is a flowchart of a fast adaptive channel changing process according to an embodiment of the present invention. In the examples given herein, it is assumed that channel information of a broadcast program that was being viewed by a user and program data that was being buffered or stored are stored in the storage unit 10 even when the DTV is turned off.

First, the user turns on the DTV in operation 21. When the DTV is turned on, the main control unit 5 signal processes program data that has been stored when the DTV was turned off, displays the program data on the image display unit 8, and then stands by for the user to input a channel change signal in operation 22. At the same time, the main control unit 5 signal processes adjacent channels of a reference channel, i.e., a current channel displayed on the image display unit 8 in operation 23. Operation 23 will be described in detail later with reference to FIG. 3.

In operation 24, the user converts (or changes) a currently viewed channel to another channel using a remote controller or the like. A channel change signal is received through the remote control signal receiving unit 9, and the main control unit 5 establishes the changed channel as a new reference channel by analyzing the channel change signal, and signal processes adjacent channels of the new reference channel in operation 23.

When a channel is changed, the main control unit 5 first examines the mapping table stored in the storage unit 10 in operation 25, and determines whether the converted channel received in operation 24 is included in the mapping table in operation 26. As will be described below, the mapping table prepared in operation 37 of FIG. 3 includes information about channel data that is signal processed and stored in the buffering unit 4 or the storage unit 10.

If the changed channel is not included in the mapping table in operation 26, then signal processing and storing have not been performed yet for the newly changed channel. Accordingly, data of the previous (or reference) channel that was being reproduced before changing the channel is continuously reproduced in operation 27 in order to prevent a screen blank time. At the same time, a signal of the newly converted channel is started to be signal processed in operation 28. After a predetermined time, such as 1.8 seconds after the channel is changed, a part of the signal of the changed channel is done being signal processed and prepared to be displayed on the image display unit 8. The channel data that is signal processed in operation 28 is displayed on the image display unit 8 in operation 30 subsequently to image data of the reference channel displayed in operation 27.

Alternatively, if the changed channel is included in the mapping table in operation 26, information about channel data corresponding to the changed channel is detected from the mapping table. Channel data is read from the buffering unit 4 by referring to the detected information, and then displayed on the image display unit 8 in operation 29. At the same time, a signal of a newly converted (changed) channel is started to be signal processed in operation 28. After the predetermined time, such as 1.8 seconds after the channel is converted, a part of the signal of the newly changed channel is done being signal processed and prepared to be displayed on the image display unit 8. The channel data signal processed in operation 28 is synchronized with the channel data displayed in operation 29, and displayed on the image display unit 8 without any screen blank time in operation 30.

Figure 3:
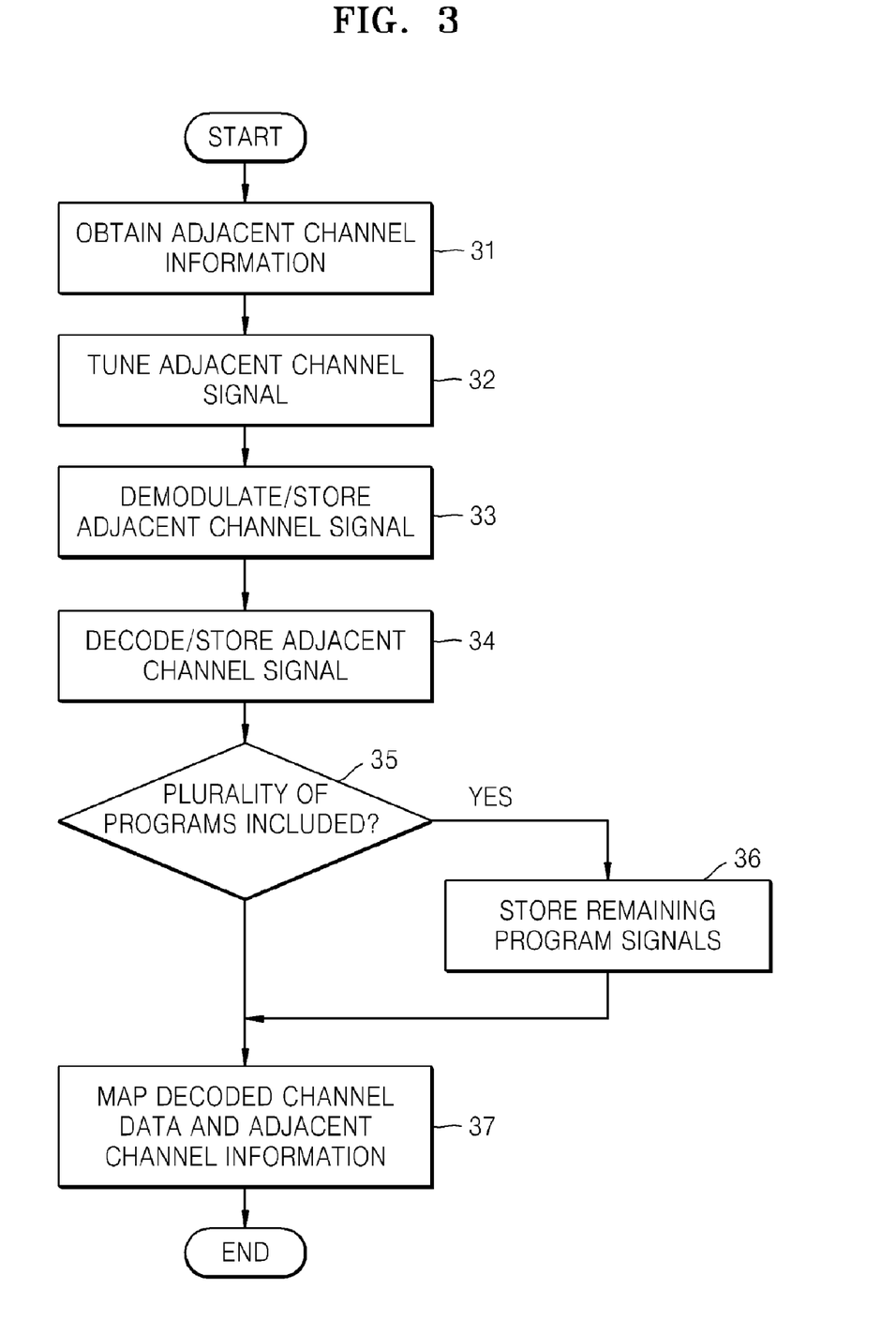
FIG. 3 is a flowchart describing in detail processing of an adjacent channel signal (operation 23) of FIG. 2.

FIG. 3 is a flowchart describing in detail processing of the adjacent channel signal (operation 23) of FIG. 2. Operations 31 through 37 are performed in a background processing technique, and repeatedly performed for each adjacent channel.

If the DTV is standing by (operation 22) to receive the channel change signal from the user, the main control unit 5 obtains channel information about adjacent channels of the channel that is currently being reproduced by referring to the channel list of FIG. 5A in operation 31. For example, when image data of a current channel KBS2 is being reproduced, channel information about a predetermined number (for example, 2) of adjacent channels (for example, MBC and EBS) that are below the current channel is obtained. According to other aspects of the present invention, channel information about two adjacent channels (for example, KBS1 and SBS) above the current channel, or channel information about an above adjacent channel (for example, KBS1) and a below adjacent channel (for example, MBC) may be obtained.

Once the channel information is obtained, the main control unit 5 assigns an idle tuner to tune an adjacent channel signal. For example, when the tuner 11 is assigned for a channel that is being reproduced on the image display unit 8, remaining tuners 12 through 1N are each assigned for adjacent channels. A tuner establishes a tuning frequency by referring to a center frequency obtained in operation 31, and filters a transport stream (TS) of the corresponding channel in operation 32.

The main control unit 5 assigns an idle demodulator, and the assigned idle demodulator demodulates the adjacent channel signal tuned in operation 32. The demodulated adjacent channel signals are stored in a buffer in operation 33. The demodulated adjacent channel signals are decoded by an A/V decoder, and then again stored in the buffer in operation 34. However, if a tuned channel signal includes a plurality of program signals, only one program signal is decoded and stored. Accordingly, channel data of an adjacent channel is generated.

In operation 35, it is determined whether each tuned channel signal includes a plurality of programs. If the tuned channel signal includes a plurality of programs, the program signals excluding one program signal that was decoded and stored are stored in the buffering unit 4 or the storage unit 10 in operation 36.

The main control unit 5 generates a mapping table by mapping the signal decoded in operation 34 and corresponding adjacent channel information, by referring to the channel list, and stores the mapping table in the storage unit 10 in operation 37. A buffer to store a signal demodulated in operation 33 and a buffer to store a signal decoded in operation 35 may be physically one buffer, or separate individual buffers.

The number of adjacent channels signal processed in operation 32 through 34 is determined based on resources of the DTV (a tuner, a demodulator, an A/V decoder, and a buffer), the amount of data that are signal processed for each channel, etc. The amount of data of each adjacent channel that is signal processed in operations 32 through 37 (or a reproducing time of buffered channel data) may be determined within a range between 1 through 5 seconds (for example 1.8 seconds) based on an average channel changing time of the user, the number of idle resources, a screen blank time, or the like.

Figure 4:
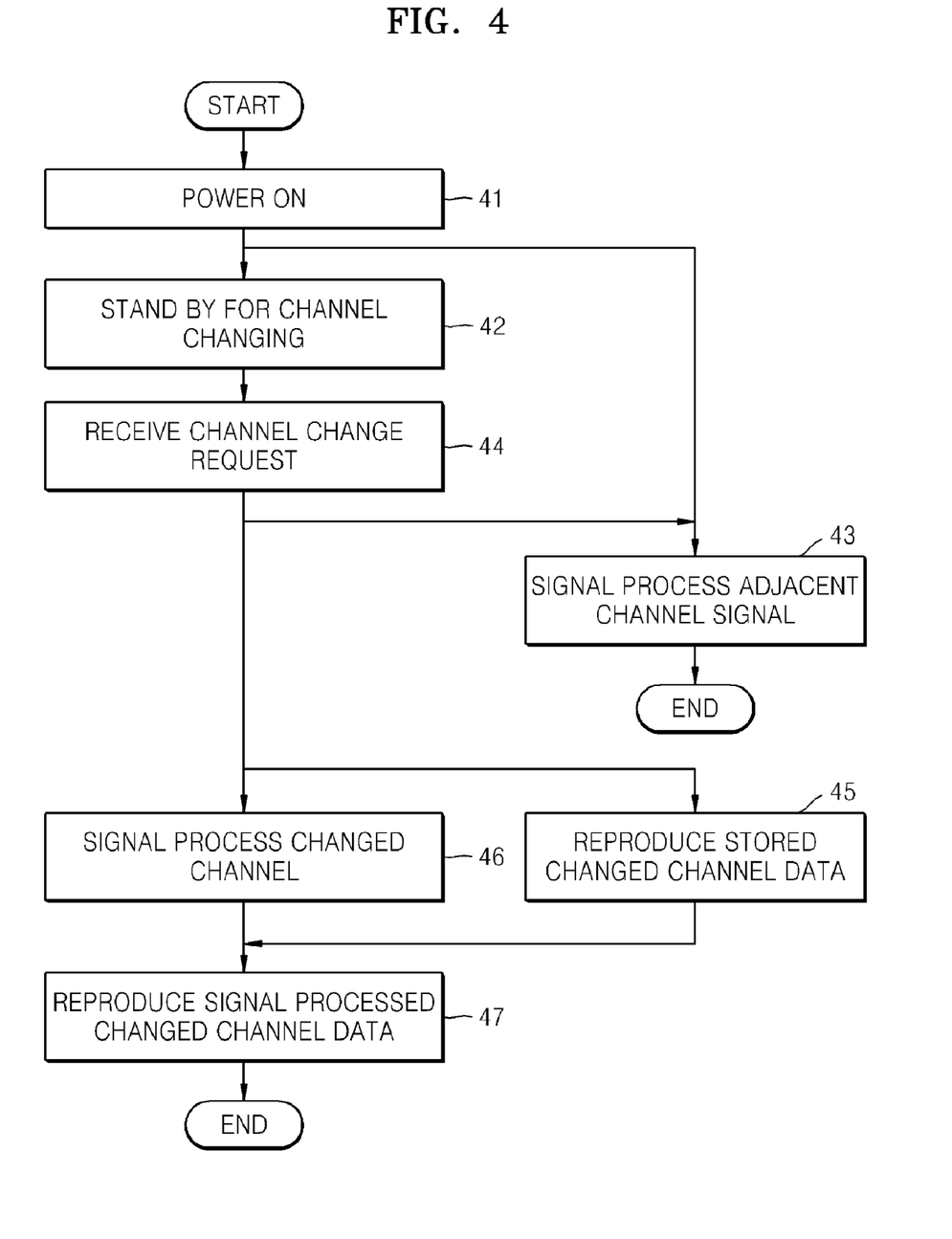
FIG. 4 is a flowchart illustrating a fast adaptive channel changing process according to another embodiment of the present invention.

FIG. 4 is a flowchart of a fast adaptive channel changing process according to another embodiment of the present invention. In the embodiment described with reference to FIG. 4, the user changes a channel to an adjacent channel included in a mapping table. In other words, the user changes the channel using a channel up key, a channel down key, or a number key of a remote controller. A signal of the changed channel is assumed to be pre signal processed in operation 43. Where an operation of the method of FIG. 4 is equal to an operation of the process of FIG. 2, the detailed description thereof will be omitted or summarized.

Once a DTV is turned on, the main control unit 5 displays channel data stored in the storage unit 10 on the image display unit 8, while standing by for a channel change signal to be inputted by the user in operations 41 and 42. At the same time, the main control unit 5 signal processes channels adjacent to the channel that is currently being reproduced in operation 43.

If the user changes the channel that is currently being reproduced to another channel using a remote controller, the channel change signal is received via the remote control signal receiver 9 in operation 44. The main control unit 5 establishes the changed channel as a new reference channel, and signal processes adjacent channels of the new reference channel in operation 43. In order to prevent a screen blank time that may occur during channel changing, image data of the changed channel stored in the buffering unit 4 that was pre-signal processed in operation 43 is read and displayed on the image display unit 8 in operation 45.

At the same time, a signal of the newly changed channel is started to be signal processed in operation 46. A predetermined time after the channel is changed, a part of the signal of the changed channel is done being signal processed and is prepared to be displayed on the image display unit 8. The changed channel data that is signal processed in operation 46 is synchronized with the image data displayed in operation 45, and displayed on the image display unit 8 in operation 47 without any screen blank time.

The fast adaptive channel converting process according to some aspects of the present invention may be applied only to preferred channels or part of channels. In the fast adaptive channel converting process as shown in FIG. 2 or 4, the channel conversion is performed using the channel list of FIG. 5A for all channels received by the DTV. However, according to another aspect of the present invention, the fast adaptive channel converting method may be performed based on a preferred channel list illustrated in FIG. 5C. For this aspect, a preferred channel list may be pre-generated by the channel list managing unit 6 and stored in the storage unit 10. A process of generating a preferred channel list will now be described with reference to FIGS. 5B and 5C.

The channel list managing unit 6 arranges channels preferred by the user by normally monitoring channel change signals received from the remote control signal receiver 9. A predetermined number, for example, 5, 20, 50, etc., of channels are selected in proportion to audience frequency, and then a channel list of the selected channels may be generated.

Figure 5B:
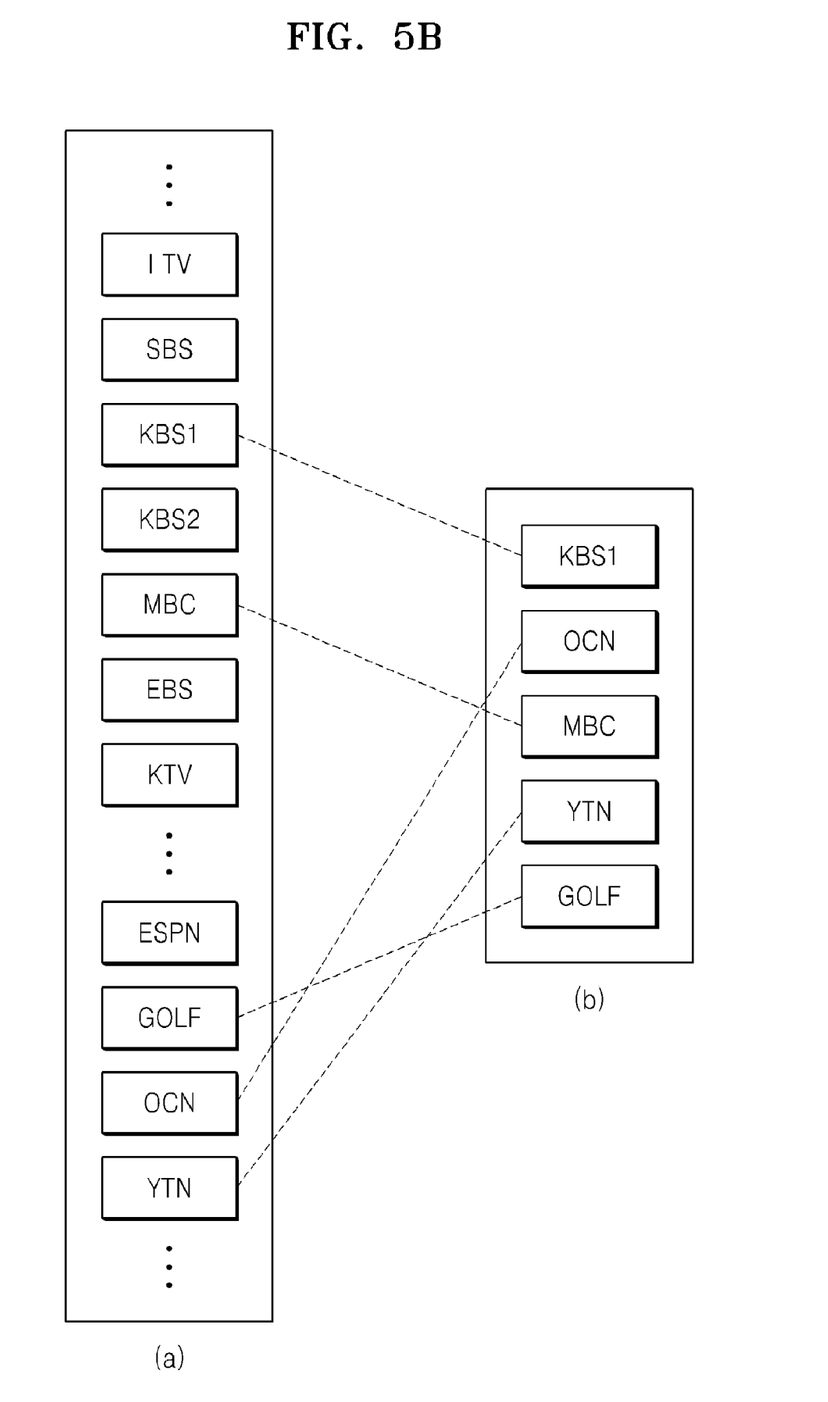
FIG. 5B is a conceptual diagram for describing a process of generating a preferred channel list according to an embodiment of the present invention.
Figure 5C:
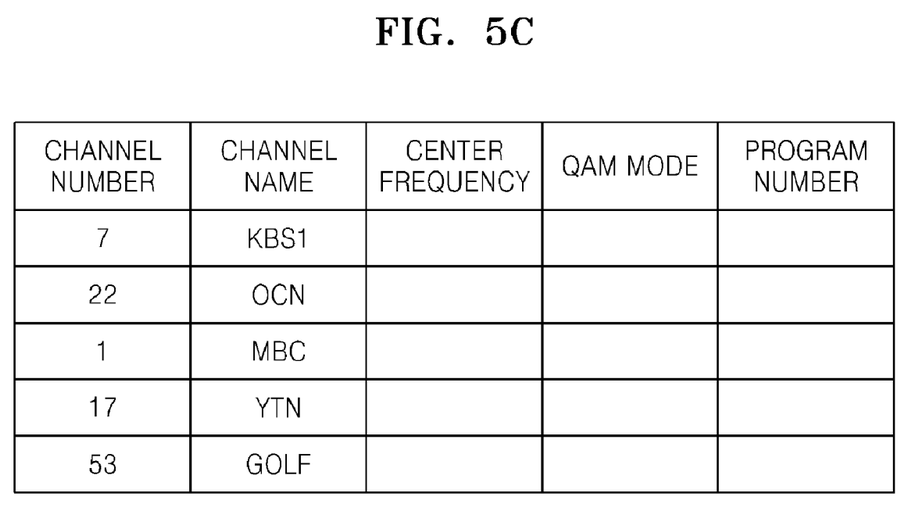
FIG. 5C is a diagram illustrating an example of a preferred channel list according to an embodiment of the present invention.

FIG. 5B is a conceptual diagram for describing a process of generating a preferred channel list according to an embodiment of the present invention. FIG. 5B(a) shows all channels received by the DTV. From these channels, a predetermined number, for example 5, of channels having high audience frequency is selected, for example, KBS1, MBC, GOLF, OCN, and YTN. The selected channels are arranged in such a way that a channel having the highest audience frequency is on the top as shown in FIG. 5B(b). For example, if the audience frequency of OCN is the second, unlike FIG. 5B(a), OCN is located above MBC in FIG. 5B(b). FIG. 5C shows an example of the preferred channel list generated by using the method of FIG. 5B. According to an embodiment of the present invention, the preferred channel list may be displayed on the image display unit 8 so as to help the user with the channel changing.

Unlike a conventional technology, the fast adaptive channel changing apparatus and method according to aspects of the present invention prevent a screen blank time that may occur while changing a channel in a digital broadcast receiving apparatus, and thus boredom or inconvenience of a user can be removed. In addition, when a channel is changed using a preferred channel list, a channel search time can be remarkably reduced, and the user can easily watch a program of a preferred channel.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs, DVDs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fast adaptive channel changing apparatus, comprising:
    a signal processing unit to signal process at least two channel signals;
    a channel list managing unit to generate a channel list including channel information related to the at least two channel signals; and
    a main control unit to control the signal processing unit to pre-signal process a channel signal corresponding to an adjacent channel of a reference channel based on the channel list,
    wherein the channel list managing unit generates a preferred channel list including channel information about a channel having a high audience frequency, and
    wherein the fast adaptive channel conversion is performed based on the preferred channel list.

2. The fast adaptive channel changing apparatus of claim 1, wherein the main control unit controls reproduction of channel data corresponding to the channel signal that is pre-signal processed by the signal processing unit, when a channel change request is received from a user.

3. The fast adaptive channel changing apparatus of claim 2, wherein the main control unit generates a mapping table including correspondence between the pre-signal processed channel data and corresponding channel information.

4. The fast adaptive channel changing apparatus of claim 3, wherein the main control unit searches for channel data corresponding to a changed channel by referring to the mapping table, when a channel change request is received from the user.

5. The fast adaptive channel changing apparatus of claim 2, wherein the main control unit controls reproduction of the pre-signal processed channel data while the signal processing unit is signal processing a changed channel signal.

6. The fast adaptive channel changing apparatus of claim 1, wherein the signal processing unit comprises at least one of: at least two tuners; at least two demodulators; at least two A/V decoder; and at least two buffers.

7. The fast adaptive channel changing apparatus of claim 1, further comprising a buffering unit to store the pre-signal processed channel data.

8. The fast adaptive channel changing apparatus of claim 1, further comprising a storage unit to store at least one of a demodulated channel signal, channel data, a channel list, and a preferred channel list.

9. A digital broadcast reproducing apparatus including the fast adaptive channel converting apparatus of claim 1.

10. A fast adaptive channel changing method comprising:
    generating adjacent channel data by pre-signal processing an adjacent channel signal of a reference channel;
    receiving a channel change request from a user;
    searching for channel data corresponding to a changed channel in the adjacent channel data; and
    reproducing the searched changed channel data,
    wherein the changed channel and the reference channel are preferred channels having a high audience frequency, and
    wherein the fast adaptive channel changing method is performed based on the preferred channels.

11. The fast adaptive channel changing method of claim 10, further comprising:
    signal processing a changed channel signal while reproducing the changed channel data.

12. The fast adaptive channel changing method of claim 10, wherein the searching for the channel data comprises determining whether the changed channel signal is pre-signal processed.

13. The fast adaptive channel changing method of claim 12, wherein the determining of whether the changed channel signal is pre-signal processed comprises determining whether the changed channel is included in a mapping table.

14. The fast adaptive channel changing method of claim 10, further comprising continuously reproducing reference channel data, when the changed channel data is not included in the adjacent channel data.

15. The fast adaptive channel changing method of claim 14, further comprising:
    signal processing a changed channel signal; and
    reproducing the signal processed changed channel data.

16. The fast adaptive channel changing method of claim 10, further comprising determining new adjacent channels adjacent to a changed channel during channel changing.

17. The fast adaptive channel changing method of claim 10, wherein the generating of the adjacent channel data comprises:
    signal processing an adjacent channel signal by referring to a channel list; and
    mapping channel information of a channel corresponding to the signal processed channel data.

18. The fast adaptive channel changing method of claim 17, wherein the generating of the adjacent channel data further comprises obtaining channel information of the adjacent channel by referring to the channel list.

19. The fast adaptive channel converting method of claim 10, wherein the generating of the adjacent channel data comprises:
    tuning an adjacent channel signal;
    demodulating the adjacent channel signal;
    decoding the demodulated adjacent channel signal; and
    storing the decoded adjacent channel signal.

20. A non-transitory computer readable recording medium having recorded thereon a program to execute a fast adaptive channel changing method comprising:
    generating adjacent channel data by pre-signal processing an adjacent channel signal of a reference channel;
    receiving a channel change request from a user;
    searching for channel data corresponding to the changed channel corresponding to the channel change request in the adjacent channel data; and
    reproducing the searched changed channel data,
    wherein the changed channel and the reference channel are preferred channels having a high audience frequency, and wherein the fast adaptive channel changing method is performed based on the preferred channels.

21. A digital television system, comprising:
a display unit;
a signal processing unit to decode channel signals into channel data displayed by the display unit; and
a fast adaptive channel changing apparatus to control the signal processing unit to perform pre-signal processing on adjacent channel signals corresponding to adjacent channels of a reference channel using idle resources of the signal processing unit,
wherein the adjacent channel and the reference channel are preferred channels having a high audience frequency, and
wherein the fast adaptive channel changing is performed based on the preferred channels.

22. The digital television system of claim 21, wherein the fast channel changing apparatus comprises:
a channel list managing unit to generate a channel list including channel information related to the reference channel and the adjacent channels; and
a main control unit to control the signal processing unit to perform the pre-signal processing on the adjacent channel signals using the idle resources.

23. The digital television system of claim 22, wherein the main control unit controls the display unit to reproduce channel data corresponding to one of the adjacent channel signals pre-signal processed by the signal processing unit, when a channel change request is received from a user.

24. The digital television system of claim 22, wherein the signal processing unit comprises:
at least one tuner to tune to a channel signal;
at least one demodulation unit to demodulate the channel signal;
at least one decoding unit to decode the channel signal into the channel data; and
at least one buffer to buffer the demodulated channel signal and/or the channel data.

25. The digital television system of claim 24, wherein the idle resources comprise at least one of the at least one tuner, the at least one demodulation unit, the at least one decoding unit, and the at least one buffer.

26. The digital television system of claim 22, wherein the main control unit determines the number of adjacent channels to be pre-signal processed based on an amount of available idle resources.

27. The digital television system of claim 22, wherein, when a channel change request to change to a changed channel is received from a user:
the main control unit controls the display unit to reproduce pre-signal processed channel data corresponding to a channel being viewed prior to the channel change request, if channel data corresponding to the changed channel has not been pre-signal processed;
the main control unit controls the display unit to reproduce pre-signal processed channel data corresponding to the changed channel if channel data corresponding to the changed channel has been pre-signal processed; and
the main control unit controls the signal processing unit to signal process a channel signal corresponding to the changed channel while the display unit is reproducing the pre-signal processed channel data corresponding to the changed channel or the previously viewed channel.

28. The digital television system of claim 22, wherein the main control unit determines the amount of channel data that is to be signal processed based on an average channel changing time of a user, a number of idle resources, or a screen blank time.

29. The digital television system of claim 22, wherein the channel list generating unit generates the channel list based on all channels receivable by the digital television system.

30. The digital television system of claim 22, wherein the channel list generating unit generates the channel list based on preferred channels of a user.

* * * * *